(12) United States Patent
Perez et al.

(10) Patent No.: US 7,790,288 B2
(45) Date of Patent: Sep. 7, 2010

(54) INTERPENETRATING POLYMER NETWORK AS COATING FOR METAL SUBSTRATE AND METHOD THEREFOR

(75) Inventors: Mario A. Perez, Burnsville, MN (US); Thomas L. Wood, Hudson, WI (US); Salvatore M. Attaguile, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 935 days.

(21) Appl. No.: 11/463,989

(22) Filed: Aug. 11, 2006

(65) Prior Publication Data

US 2007/0036982 A1 Feb. 15, 2007

Related U.S. Application Data

(60) Provisional application No. 60/707,333, filed on Aug. 11, 2005.

(51) Int. Cl.
| | |
|---|---|
| B32B 15/092 | (2006.01) |
| B32B 27/08 | (2006.01) |
| B32B 27/32 | (2006.01) |
| B32B 27/38 | (2006.01) |
| C08L 63/00 | (2006.01) |
| B05D 1/38 | (2006.01) |

(52) U.S. Cl. ............... 428/416; 428/35.7; 428/36.9; 428/36.91; 428/414; 428/418

(58) Field of Classification Search ............. None
See application file for complete search history.

(56) References Cited

U.S. PATENT DOCUMENTS

| | | | |
|---|---|---|---|
| 4,057,657 A | 11/1977 | Garnett et al. | |
| T973,015 I4 | 8/1978 | Chadwick et al. | |
| 5,300,336 A * | 4/1994 | Wong et al. ............... | 428/35.9 |
| 5,709,948 A | 1/1998 | Perez et al. | |
| 5,792,518 A | 8/1998 | Gibson et al. | |
| 6,235,361 B1 | 5/2001 | Jacquemet et al. | |
| 6,355,735 B1 | 3/2002 | Wagner et al. | |
| 2004/0191515 A1 | 9/2004 | Mullen | |

FOREIGN PATENT DOCUMENTS

| | | |
|---|---|---|
| CA | 2056635 | 6/1992 |
| JP | 58-074336 | 5/1983 |
| JP | 62-230876 | 10/1987 |
| JP | 02-106341 | 4/1990 |
| JP | 06-248248 | 9/1994 |
| JP | 11-323201 | 11/1999 |
| KR | 10-2004-0071489 A * | 8/2004 |
| WO | WO 97/11122 | 3/1997 |
| WO | WO 98/06511 | 2/1998 |
| WO | WO 98/24560 | 6/1998 |

OTHER PUBLICATIONS

Machine translation of KR 10-2004-0071489 A, provided by the KIPO website (no date).*
Symonds, N. et al., "Polymeric coatings for impact and wear resistance I: Wear", *Wear 225-229* (1999), Elsevier Science S.A.; pp. 111-118.
Mathew, A.P. et al., "Transport of aromatic solvents through natural rubber/polystyrene (nr/ps) interpenetrating polymer network membranes", *Journal of Membrane Science 201* (2002), Elsevier Science S.A.; pp. 213-227.
Kim, H.W. et al., "Preparation and hydrolytic degradation of semi-interpenetrating networks of poly(3-hydroxyundecenoate) and poly(lactide-co-glycolide)", *International Journal of Biological Macromolecules 37* (2005), Elsevier Science S.A., pp. 221-226.
Office Action dated Dec. 18, 2009, cited in U.S. Appl. No. 11/463,992, filed Aug. 11, 2006, entitled "Interpenetrating Polymer Network as Coating for Metal Substrate and Method Therefor".

* cited by examiner

*Primary Examiner*—Michael J Feely
(74) *Attorney, Agent, or Firm*—Gregg H. Rosenblatt

(57) ABSTRACT

A coated article and method therefor comprises a metal substrate comprising a layered coating composition on at least one surface thereof, the coating composition comprising a layer of epoxy on one or more of the surfaces of the substrate. The coating composition further comprises an overcoat layer comprising a combination of polyolefin and epoxy resins, the overcoat layer optionally being free of added epoxy curative. The article can be a pipe, vessel, conduit, rod, profile-shaped article, or tube. A preferred overcoat layer comprises a semi- or full-epoxy/polyolefin interpenetrating polymer network (IPN). In another embodiment, the coated article comprises a polyolefin/epoxy layer that is directly coated on at least one surface of a metal substrate, the polyolefin/epoxy coating being overcoated with a thermoplastic top coating, the coated article being free of added adhesive. The metal article preferably is a pipe, vessel, conduit, rod, profile shaped article or tube.

18 Claims, 3 Drawing Sheets

INTERPENETRATING POLYMER NETWORK AS COATING FOR METAL SUBSTRATE AND METHOD THEREFOR

CROSS REFERENCE TO RELATED APPLICATION

This application claims the benefit of U.S. Provisional Application No. 60/707,333, filed Aug. 11, 2005, the disclosure of which is incorporated by reference herein in its entirety.

FIELD OF THE INVENTION

This invention relates to a metal substrate coated with single or multiple layers, at least one of which is an interpenetrating polymer network. The metal substrate can be, for example, a pipe, vessel, conduit, rod, profile shaped article, or tube.

BACKGROUND ART

Today's technological society requires housing and transporting fluids, such as petroleum, water, natural gas, methane, ammonia, liquid air, gasoline, oxygen, nitrogen, hydrogen, as well as various industrial chemicals. The interior of the vessel, pipe, or tube can be subjected to a harsh environment because of the chemical nature of the fluid housed or transported and the temperature and pressure involved. The exterior of the vessel, pipe, or tube can be in contact with a corrosive environment, such as seawater, soil, rock, air, or other gases, liquids or solids.

Various single or multilayer coatings are known in the art to protect the interior and exterior surfaces of vessels, pipes, and tubes housing and transporting industrial fluids. U.S. Pat. No. 5,709,948 discloses a semi-interpenetrating polymer network (semi-IPN) as a coating for steel pipes and storage vessels. The semi-IPN coating comprises a fully pre-polymerized uncrosslinked (linear) polyolefin and a crosslinked epoxy polymer.

SUMMARY OF THE INVENTION

In one aspect, the present invention provides a coated article comprising a metal substrate comprising a layered coating composition on at least one surface thereof, the coating composition comprises a layer of epoxy resin, preferably, a partially or fully cured fusion bonded epoxy, on one or more of the surfaces of the substrate, the coating composition further comprising an overcoat layer comprising a combination of epoxy and polyolefin resins, the overcoat layer optionally being free of added epoxy curative, and the coated article optionally being free of an added adhesive layer between the fusion-bonded epoxy layer and the overcoat layer.

In a preferred embodiment of the coated article of the invention, the overcoat layer of the coating composition comprises a) 0.1 to 50 weight percent of a curable epoxy resin, the weight percent being based on the total resin composition; and b) 50 to 99.9 weight percent of at least one hydrocarbon polyolefin resin and optionally a functionalized polyolefin resin, the weight percent being based on the total resin composition, wherein the hydrocarbon polyolefin is present in the range of 1 to 99.9 weight percent of the total resin composition and the functionalized polyolefin is present in the range of 0 to 98.9 weight percent of the total resin composition.

In another embodiment, an aspect of the present invention provides a composite article comprising a metal substrate having a layer of fusion-bonded epoxy on at least one surface thereof, the fusion bonded epoxy layer being overcoated by a layer of polyolefin/epoxy semi- or full-interpenetrating polymer network (IPN), the IPN comprising a fully prepolymerized uncrosslinked, crosslinkable, or crosslinked polyolefin and a second polymer comprising a curable epoxy resin. The IPN layer optionally is free of added curative for the epoxy resin, the composite article optionally further comprises a polyolefin protective topcoat layer and one or more adhesive and tie layers.

In yet another aspect, the present invention provides a coated article comprising a metal substrate and coated directly on at least one surface thereof a layer of an epoxy/polyolefin composition comprising an epoxy polymer that can be crosslinked in the presence of a polyolefin that is crosslinkable or crosslinked, when cured the epoxy/polyolefin can provide a full-IPN coating on the metal surface. It is unexpected that the full-IPN coating providing an unusually stable coated article at elevated temperatures. In this embodiment, the article can be free of a fusion-bonded epoxy layer or any other adhesive layer between the metal substrate and the epoxy/polyolefin full-IPN coating.

In a further embodiment, the present invention provides a coated article comprising a metal substrate having on at least one surface thereof a layer of semi- or full-polyolefin/epoxy IPN, the coated article further comprising a thermoplastic top coat, the coated articled being free of added adhesive between any of the layers. The top coat can comprise one or more thermoplastic polymers.

Preferably, the polyolefin of the IPN comprises one or both of polypropylene and polyethylene.

The coating composition can be coated on one or both surfaces of the metal substrate and can comprise additional layers, such as bonding, tying, protective, and topcoat layers. The metal substrate can be, for example, at least one of the inner and outer surfaces of a pipe, vessel, conduit, rod, profile shaped article, or tube. A tacky tie layer can be between layers in the composite, including between an outer protective or insulating layer and an underlying layer.

In another aspect, the present invention provides a method for producing a coated article comprising the steps of:

a) providing a metal substrate, b) providing a layer of epoxy resin, preferably a partially or fully cured fusion-bonded epoxy, on at least one surface of said metal substrate, c) providing a molten mixture comprising
  i) a curable crosslinkable epoxy resin, the resin optionally being free of added epoxy curative, and
  ii) a fully prepolymerized, uncrosslinked, crosslinkable, or crosslinked polyolefin polymer, d) applying a layer of the molten mixture of step c) to the surface of the fusion-bonded epoxy layer of step b), and e) at any subsequent time, initiating crosslinking of the polymers in the molten mixture to produce a semi- or full-IPN on the surface of the fusion-bonded epoxy layer to produce the coated article.

In another preferred embodiment, the mixture of step c) can be provided as a powder (pulverized pellets) of IPN and sprayed onto the heated fusion-bonded epoxy layer where its cure is completed. It can also be useful to spray the pulverized pellets directly onto the heated substrate.

In yet another preferred embodiment, the mixture of step c) is provided as a continuous extrudate from an extruder as a molten flat sheet having a width in the range of 2 cm to 2 m, preferably 10 cm to 50 cm, a thickness in the range of 0.1 mm to 10 mm, preferably 0.5 mm to 5 mm, and a length in the range of 0.5 cm to 50 m, preferably 3 m to 25 m, that can be spirally wrapped around a hot substrate (e.g., a hot pipe) or a hot fusion-bonded epoxy-coated substrate where the cure of the epoxy/polyolefin IPN can be completed.

In still another aspect, the present invention relates to a method for joining sections of coated pipe, the method comprising the steps of:

a) providing two sections of metal pipe, each section of metal pipe having at least one coating on its outer surface, the coating comprising a layer of at least one polymer which can comprise a semi- or full-IPN, or a thermoset or thermoplastic polymer, and b) aligning the sections of metal pipe end-to-end to form a desired closure, applying an overcoat layer of epoxy/polyolefin semi- or full-IPN to the closure and to any desired additional area of coated pipe to form a seam and to secure the joint.

It may be desirable for the IPN overcoat layer to be scored, perforated, patterned, or microreplicated in order, for example, to allow for venting of entrapped gases such as air when applying the layer.

In a still further aspect, the invention relates to a method for patching a coated metal substrate, e.g., a metal pipe, comprising the steps of:

a) providing a metal substrate having one or more coatings on its outer surface, the outermost coating comprising a epoxy/polyolefin semi- or full-IPN coating or thermoplastic or thermosetting polymeric coating, and optionally one or more intermediate epoxy and tie layers and topcoat layers, the outermost coating comprising an area having at least one discontinuity therein that optionally exposes one or more portions of the additional coatings and optionally a portion of the surface of the substrate, b) overcoating the area of the IPN or other polymeric coating comprising the discontinuity and any desired additional area surrounding the discontinuity and fusion bonding thereto an overcoat layer comprising an epoxy/polyolefin semi- or full-IPN so as to form a patch over the discontinuity in the semi- or full-IPN or other polymeric coating and in any of the exposed portions of the intermediate layers and the exposed surface of the substrate, the overcoating of semi- or full-IPN forming a secure patch over the at least one discontinuity and additional surrounding area.

The invention is useful to provide a corrosion protected pipe, vessel, conduit, rod, profile shaped article, or tube that transport or are exposed (on any surface) to fluids at different temperatures and pressures and having different chemical compositions. Transported and stored fluids can be flowing at various velocities. Layers of the coating can provide corrosion protection to the metal substrate and act as a thermal insulator. Protected articles of the invention also have resistance to chipping (on impact), are flexible enough to allow for bending of the substrate without cracking or delamination, and have improved abrasion resistance. Multilayers of the coating can be coated individually in sequence or simultaneously.

In this application:

"cathodic disbandment" means the destruction of adhesion between a coating and its substrate by products of a cathodic reaction; cathodic disbandment data with a result of less than 8 mm (radius) at 65° C. is considered satisfactory;

"epoxy/(poly)olefin IPN", "epoxy/polyolefin", "polyolefin/epoxy", "epoxy/olefin", and "IPN" mean a network of two polymers as defined in full-IPN and semi-IPN herein;

"full-interpenetrating polymer network (full-IPN)" means a network of at least two polymers, one (e.g., epoxy) can be crosslinked in the presence of a second polymer (e.g., polyolefin) that is crosslinkable or is already crosslinked;

"fusion-bonded epoxy" or "FBE" means an epoxy powder resin that has been heat cured to provide a continuous tough moisture and chemical resistant dielectric coating to any of a variety of substrates;

"fusion-bonded" means any powder resin that has been heat cured to provide a continuous tough moisture and chemical resistant dielectric coating to any of a variety of substrates;

"IPN" means interpenetrating polymer network and includes semi-epoxy/polyolefin IPN and full-epoxy/polyolefin IPN;

"profile shaped article" means an article having a complex or irregular cross section;

"semi-interpenetrating polymer network (semi-IPN)" means a polymer network of two or more polymers wherein one polymer is crosslinkable or crosslinked (i.e., epoxy) and the other is uncrosslinked (i.e., polyolefin), the uncrosslinked polymer being linear;

"tie layer" means the material joining two layers together and having a thickness in the range of 0.01 to 5 mm; and "top coat" means a protective outer layer or coating having a thickness in the range of 0.2 mm to 300.0 mm, preferably 0.5 to 5 mm.

It is believed to be advantageous and novel in the art to use an IPN (epoxy/polyolefin) layer coated onto a fusion-bonded epoxy layer wherein the IPN layer is free of added curative for the epoxy resin. This layer serves as a protective anti-corrosion coating on a metal pipe, vessel, conduit, profile shaped article, rod, or tube. The fusion-bonded epoxy layer can have a thickness in the range of 0.025 mm to 5 mm, preferably 0.15 mm to 0.4 mm.

It represents an advance in the art to use such semi-IPNs or full-IPNs coated directly onto fusion-bonded epoxy coated metal substrates or directly onto metal substrates all without an intermediate adhesive layer, particularly when the IPN is sprayed as a powder, melt, or extrudate, or it can be spirally wound in the molten state as described above. Partially-cured or fully-cured fusion-bonded epoxy resin adheres to steel. However, being a thermoset the fusion-bonded epoxy layer can be brittle and subject to cracking during handling and transportation and must be overcoated by a protective layer. IPNs provide a protective layer because they strongly adhere directly to fusion-bonded epoxy or directly to metal substrates. No adhesive is needed. This represents an unexpected advance in the art. Many prior art metal pipes require an adhesive layer, such as a layer of functionalized polyolefin adhesive, between a fusion-bonded epoxy layer on a metal pipe and an overcoat protective layer. Unexpectedly, a full-IPN layer provides an excellent protective layer, even at elevated temperatures, when coated directly onto a metal surface, such as a steel pipe. Metal surfaces coated with IPN layers having a dried thickness in the range of 0.02 mm to 300.00 mm, preferably in the range of 0.50 mm to 5.00 mm, show superior impact resistance and superior cohesion compared to known conventional coated metal pipes, vessels, conduits, profile shaped articles, rods, or tubes that do not use IPN constructions.

Additionally, the IPNs of the present invention are advantageous over conventional coatings on metal surfaces in that the IPNs have unusually strong bonding ability to metals and partially or fully cured fusion-bonded epoxy layers without requiring the use of intervening adhesive layers. For example, in some embodiments a pipe, vessel, conduit, rod, profile shaped article, or tube can be directly coated with an IPN layer and then overcoated with a thermoplastic topcoat protective/insulative layer, thus providing a two-layer system on a metal substrate showing excellent adhesion to the metal surface and excellent cohesion of the coated layers. This system provides processing and economic advantages. In another embodiment, a multi-layer system comprises a composite coating having a fusion-bonded epoxy layer adjacent the metal surface, then the IPN layer, and next an optional thermoplastic topcoat layer. The epoxy resin used in the IPN layer optionally can be free of added curative, providing processing and economic advantages.

Also, the article of the present invention comprising an IPN coating exhibits improved cathodic disbandment and impact resistance compared to conventional thermoplastic or thermosetting polymer coated metal substrates. There has been achieved better interlayer adhesion than is known in the art for similar articles not using IPN coatings.

DETAILED DESCRIPTION

Polyolefin and epoxy components and curative(s) therefore useful in the present invention are disclosed in U.S. Pat. No. 5,709,948, which disclosure is incorporated herein by reference. The semi- and full-IPNs differ from each other in that the polyolefin component in the semi-IPN is linear and not crosslinked whereas in the full-IPN it is crosslinked. Crosslinking of the polyolefin component can be accomplished by including, for example, crosslinking agents such as free radical initiators (e.g., organic peroxides such as dicumyl peroxide) as are known in the art. Crosslinking of the epoxy and polyolefin components can be caused, by photochemical or thermal means, to take place simultaneously or sequentially.

Figure 1:
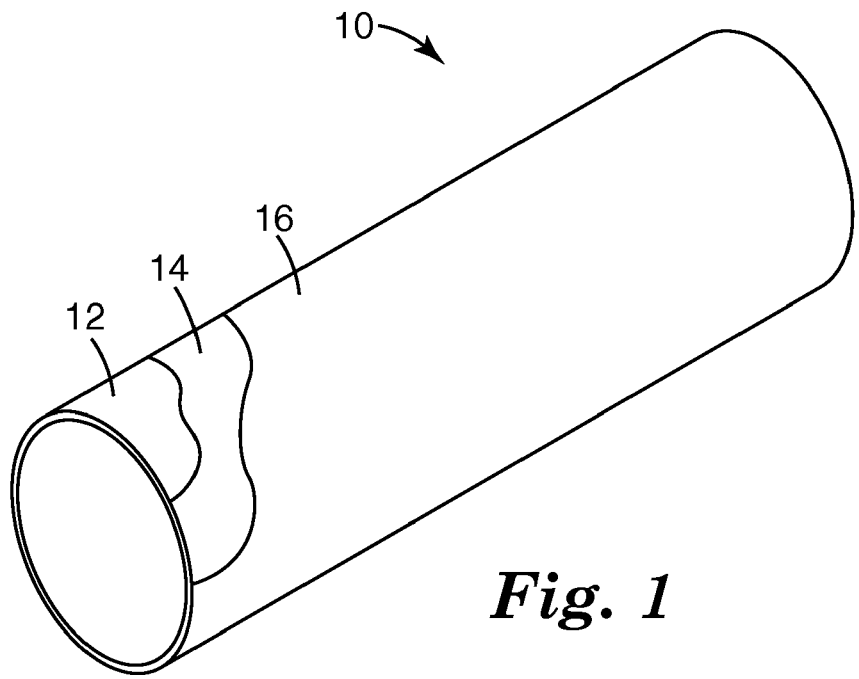
FIG. 1 shows a perspective view of metal pipe having a layered coating comprising a layer of a semi- or full-interpenetrating polymer network.

Referring to the Accompanying Drawings:

FIG. 1 shows a perspective view, parts broken away, of coated metal pipe 10 comprising metal pipe 12 and a fusion-bonded epoxy (FBE) layer 14 on the outer surface of pipe 12. The FBE layer 14 is overcoated with a layer of semi- or full-interpenetrating polymer network (IPN) 16. These coatings can be on one or both of the inner surface (not shown) and outer surface of metal pipe 12. In some embodiments, any of epoxy layers, other adhesive layers, tie layers, and protective layers (not shown) can be present.

Figure 2:
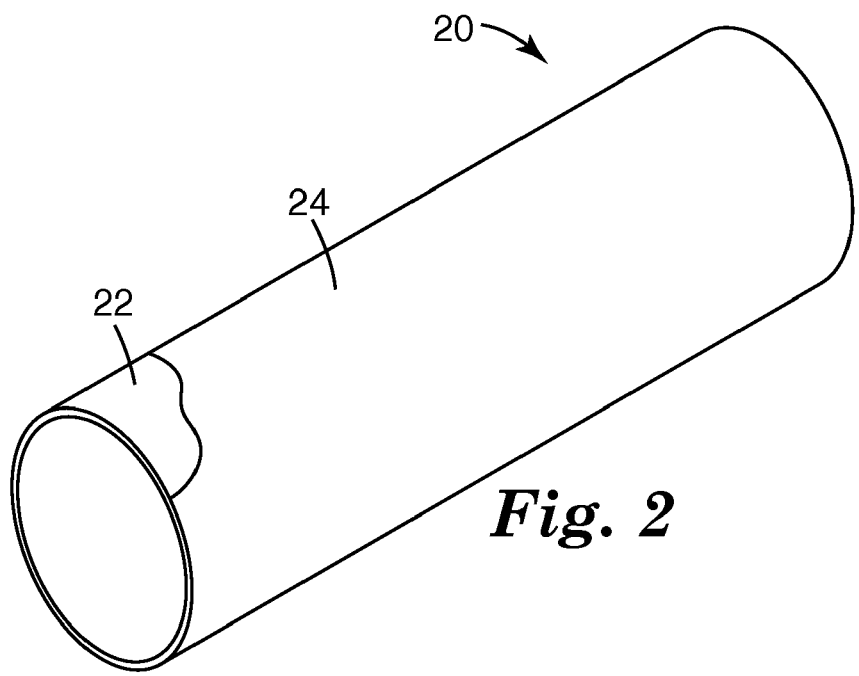
FIG. 2 shows a perspective view of a metal pipe comprising a layer of a full-interpenetrating polymer network.

FIG. 2 shows a perspective view, part broken away, of coated metal pipe 20 comprising pipe 22 and a layer of full-interpenetrating polymer network 24 on the outer surface of pipe 22. Full-IPN layer 24 can be on one or both of the inner surface (not shown) and outer surface of the pipe 22. In some embodiments (not shown), any of FBE, adhesive layers, tie layers, and protective layers, not shown, can be present. In another embodiment (not shown), the IPN layer can be a semi- or full-IPN and the coated pipe further comprises a thermoplastic protective top coat, the coated pipe being free of added adhesive between any of the layers.

Figure 3:
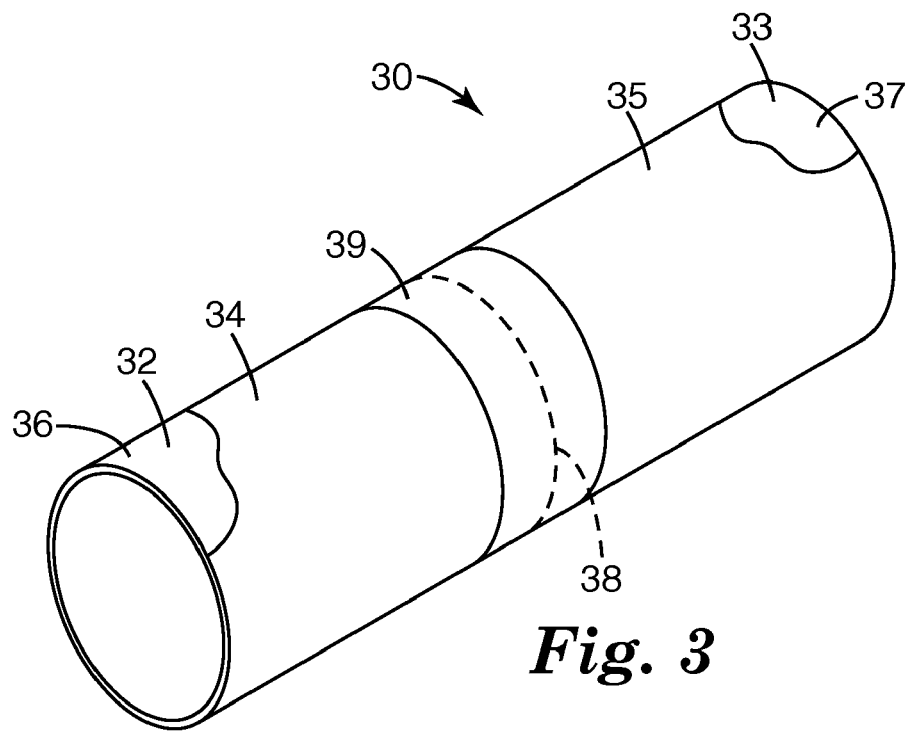
FIG. 3 shows a perspective view of a two-sections of metal pipe having a girth weld coating comprising a semi- or full-interpenetrating polymer network.

FIG. 3 shows a perspective view, part broken away, of a girth-welded metal pipe 30. As shown, two sections of coated metal pipes 32,33 comprise polymeric layers or coatings 34,35 on the outer surfaces of pipes 36,37. Polymeric layers 34,35 can comprise any of semi- or full interpenetrating polymer networks, thermoplastic polymers, and thermosetting polymers. In some embodiments (not shown), additional epoxy, fusion-bonded epoxy, tie, protective, or other adhesive layers can be present. Coated metal pipes 32,33 have been aligned so that exposed ends of pipes 36, 37 can be bonded, as by welding, so as to join them end-to-end to form joint 38. Optionally, a primer (not shown) can be applied to exposed joined ends of pipes 36, 37. Girth weld 39 comprises a layer of semi- or full IPN that covers joint 38 and overlaps additional area of coated metal pipes 32,33 and seals joint 38. The semi- or full-IPN girth weld 39 optionally can be one or both of oriented and heated to produce a shrink-wrapped girth weld coating.

Figure 4:
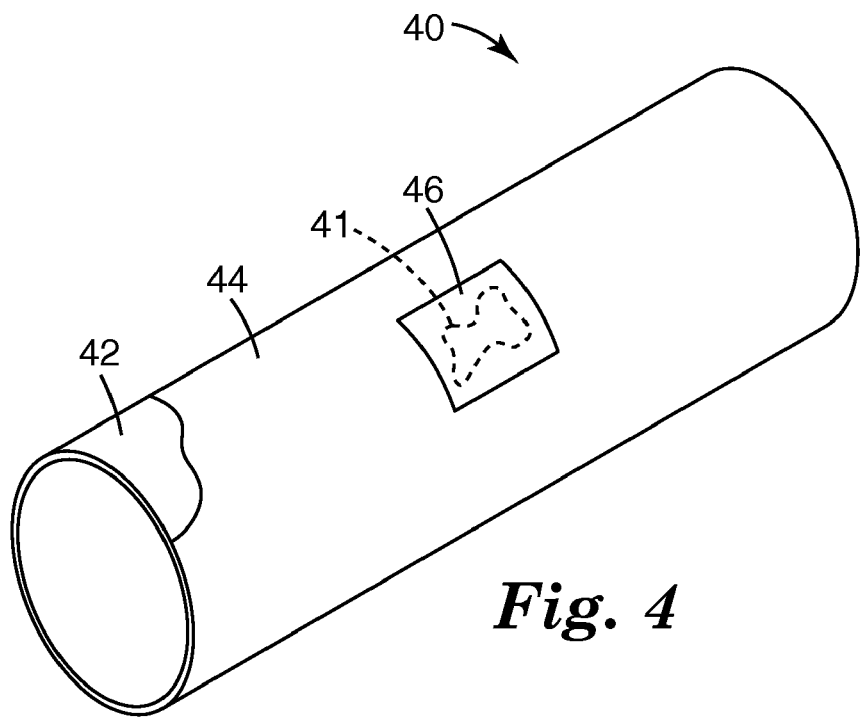
FIG. 4 shows a perspective view of a coated metal pipe of the invention comprising a semi- or full-interpenetrating polymer network patch over a discontinuity in the pipe coating.

FIG. 4 shows a perspective view, parts broken away, of a patched metal pipe 40. As shown, patched metal pipe 40 comprises polymeric coating 44. Coating 44 comprises a polymeric layer on the outer surface of pipe 42 that can comprise any of a layer of semi- or full-interpenetrating polymer, a thermoplastic polymer, and a thermosetting polymer. In some embodiments (not shown), additional fusion-bonded epoxy, adhesive, tie, or protective layers can be present. Discontinuity 41 can be a tear, hole, or abrasion in polymeric coating 44 and in any of the optional FBE, adhesive, tie, or protective layers that can be present. Patch 46, comprising a film of semi- or full-interpenetrating polymer plugs and covers discontinuity 41 in polymeric coating 44 and in any other optional layers in which it is present. IPN patch 46 also covers additional surrounding area of polymeric coating 44 to provide a secure patch.

Figure 5:
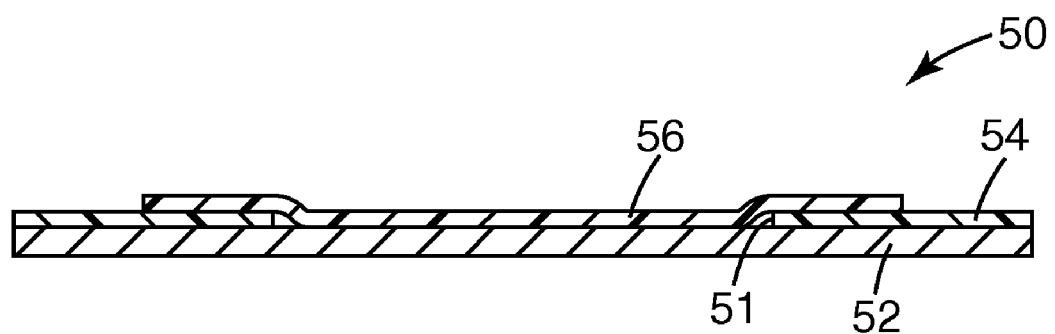
FIG. 5 shows a cross-sectional view of a patched coated metal pipe of the invention.

FIG. 5 shows a cross-sectional view, parts broken away, of a patched coated metal substrate 50 of the invention. Metal substrate 52 comprises a polymeric coating 54 on its surface. Polymeric coating 54 comprises any of a semi- or full-IPN layer, a thermoplastic polymeric layer, and a thermosetting polymeric layer. Polymeric coating 54 comprises a discontinuity 51 therein that, as shown, has been plugged and overcoated with patch 56 comprising a layer of semi- or full-IPN. Patch 56 covers discontinuity 51 and surrounding additional area of polymeric coating 54. Additional FBE, adhesive, tie, or protective layers (not shown) may be present in coated substrate 50.

Figure 6:
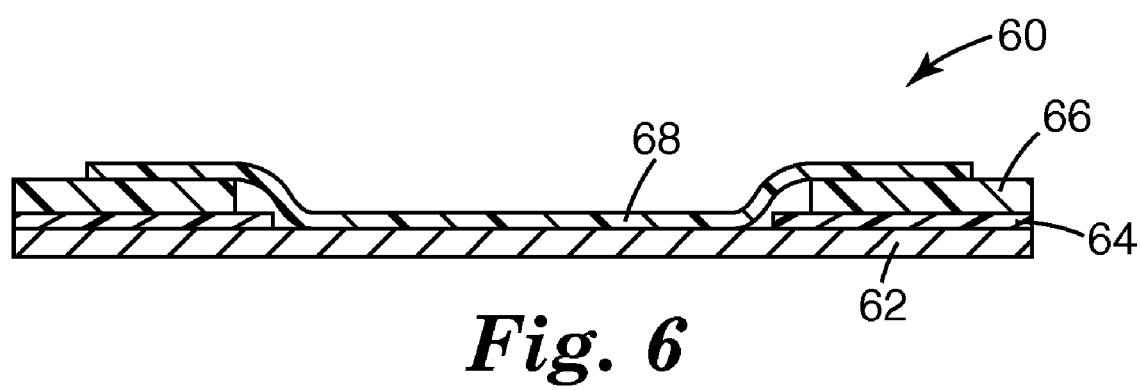
FIG. 6 shows a cross-sectional view of a patched coated metal pipe of the invention wherein the metal pipe comprises a layered coating.

FIG. 6 shows a cross-sectional view of patched coated metal substrate 60 comprising metal substrate 62 having polymeric coating 64 on a surface thereof. Polymeric coating 64 comprises any of a semi- or full-interpenetrating polymeric network layer, a thermoplastic polymeric layer, and a thermosetting polymeric layer. As shown, polymeric coating 64 is overcoated with protective coating 66. Patch 68 comprising a film of semi- or full-IPN overlays and substantially fills a discontinuity in coatings 64 and 66. Patch 68 also covers surrounding additional areas of coatings 64 and 66 to produce a secure patch. Additional FBE, adhesive, tie, or protective layers (not shown) may be present in coated substrate 60.

Preferred polyolefins useful in the IPNs of the present invention include high density polyethylene, ultra-high molecular weight polyethylene, linear low density polyethylene, low density polyethylene, metallocene polyolefins, unsaturated polyolefin rubbers, saturated polyolefin rubbers, isotactic polypropylene, syndiotactic polypropylene, atactic polypropylene, polymethylpentene, cyclic olefins (for example, ethylene norbornene copolymers), polybutene, and combinations, blends, and mixtures thereof.

An aspect of the present invention provides a curable composition comprising:
 a) 0.1 to 50 weight percent, preferably 0.1 to 40, most preferably 0.5 to 20 weight percent, of a curable epoxy resin, the weight percent being based on the total resin composition;
 b) optionally, an effective amount of a curative for the curable epoxy resin;
 c) 50 to 99.9 weight percent, preferably 60 to 99.9, most preferably 80 to 99.5 weight percent, of at least one of a fully prepolymerized hydrocarbon polyolefin resin and optionally a fully prepolymerized functionalized polyolefin resin, the weight percent being based on the total resin composition;
wherein the hydrocarbon polyolefin is present in the range of 1 to 99.9 weight percent, preferably 40 to 99.9 weight percent, most preferably 70 to 99.9 weight percent, of the total resin composition and the functionalized polyolefin is present in the range of 0 to 98.9 weight percent, preferably 0 to 20 weight percent, most preferably 0 to 10 weight percent, of the total resin composition.

A preferred IPN formulation for the coated article of the invention comprises 80-98 weight percent rubber modified polypropylene, 1-10 weight percent functionalized polypropylene, 1 to 10 weight percent Bisphenol-A epoxy resin, all based on the weight of the total resin composition. Also, 0.1 to 5.0 weight percent of an epoxy-curing catalyst can be added.

In another preferred embodiment, the IPN formulation for the coated article of the invention comprises 50-99.8 weight percent rubber modified polypropylene, 0.1 to 20 weight percent weight percent functionalized polypropylene, and 0.1 to 50 weight percent epoxy resin.

Preferably, blending of the components takes place at a temperature that is below the thermal activation temperature of the catalyst. Preferably, the functionalized polyolefin comprises at least one O, N, S, P, or halogen atom.

The invention provides cured compositions comprising fully pre-polymerized and optionally cured hydrocarbon polyolefin and optionally a functionalized polyolefin resin having improved properties by the inclusion of cured epoxy resin, that can produce a semi- or full-IPN. Improved properties include excellent adhesion to metals and polar surfaces, and as polymeric protective coatings.

The inclusion of epoxy resins in a fully pre-polymerized hydrocarbon polyolefin continuous phase provides the polyolefin with a number of advantageous properties. Curable low-molecular weight epoxy resins serve to decrease the melt viscosity of the polyolefins, imparting improved handling and processing, e.g., easier die extrusion and incorporation of larger amounts of fillers and adjuvants. Low-molecular weight epoxy resins improve adhesion of the IPNs to various substrates, in part because such low-molecular weight species can quickly migrate to the IPN-substrate interface for improved bonding, perhaps through improved wetting or reaction of the epoxy functionality with functional groups on the substrate surface.

Epoxy resins of the invention preferably comprise compounds which contain one or more 1,2-, 1,3- and 1,4-cyclic ethers, which also may be known as 1,2-, 1,3- and 1,4-epoxides. The 1,2-cyclic ethers are preferred. Such compounds can be saturated or unsaturated, aliphatic, alicyclic, aromatic or heterocyclic, or can comprise combinations thereof. Compounds that contain more than one epoxy group (i.e., polyepoxides) are preferred.

Aromatic polyepoxides (i.e., compounds containing at least one aromatic ring structure, e.g., a benzene ring, and more than one epoxy group) that can be used in the present invention include the polyglycidyl ethers of polyhydric phenols, such as Bisphenol A-type resins and their derivatives, epoxy cresol-novolac resins, Bisphenol-F resins and their derivatives, and epoxy phenol-novolac resins; and glycidyl esters of aromatic carboxylic acids, e.g., phthalic acid diglycidyl ester, isophthalic acid diglycidyl ester, trimellitic anhydride trigylcidyl ester, and pyromellitic acid tetraglycidyl ester, and mixtures thereof. Preferred aromatic polyepoxides are the polyglycidyl ethers of polyhydric phenols, such as the EPON series of diglycidyl ethers of Bisphenol-A, including EPON 828 and EPON 1001F, available commercially from Resolution Performance Products, Inc., Houston, Tex.

Representative aliphatic cyclic polyepoxides (i.e., cyclic compounds containing one or more saturated carbocyclic rings and more than one epoxy group, also known as alicyclic compounds) useful in the present invention include the "ERL" series of alicyclic epoxides commercially available from Dow Chemical Co., Inc., Midland, Mich., such as vinyl cyclohexene dioxide (ERL-4206), 3,4-epoxycyclohexylmethyl-3,4-epoxycyclohexane carboxylate (ERL-4221), 3,4-epoxy-6-methylcyclohexylmethyl-3,4-epoxy-6-methyl-cyclohexane carboxylate (ERL-4201), bis(3,4-epoxy-6-methylcycylohexylmethyl)adipate (ERL-4289), dipenteric dioxide (ERL-4269), as well as 2-(3,4-epoxycyclohexyl-5.1"-spiro-3",4"-epoxycyclohexane-1,3-dioxane, 4-(1,2-epoxyethyl)-1,2-epoxycyclohexane and 2,2-bis(3,4-epoxycyclohexyl)propane. Preferred alicyclic polyepoxides are the ERL series.

Representative aliphatic polyepoxides (i.e., compounds containing no carbocyclic rings and more than one epoxy group) include 1,4-bis(2,3-epoxypropoxy)butane, polyglycidyl ethers of aliphatic polyols such as glycerol, polypropylene glycol, 1,4-butanediol, and the like, and the diglycidyl ester of linoleic dimer acid.

A wide variety of commercial epoxy resins are available and are listed or described in, e.g., the *Handbook of Epoxy Resins*, by Lee and Neville, McGraw-Hill Book Co., New York (1967); *Epoxy Resins, Chemistry and Technology*, Second Edition, C. May, ed., Marcell Decker, Inc., New York (1988); and *Epoxy Resin Technology*, P. F. Bruins, ed., Interscience Publishers, New York, (1968). Any of the epoxy resins described therein may be useful in preparation of the IPNs of the invention.

It is within the scope of the present invention to include, as a bireactive comonomer, compounds having both epoxy functionality and at least one other chemical functionality, such as, e.g., hydroxyl, acrylate, ethylenic unsaturation, carboxylic acid, carboxylic acid ester, and the like. An example of such a monomer is EBECRYL 3605, commercially available from UCB Radcure, Inc., Atlanta, Ga., a Bisphenol-A-type monomer having both epoxy and acrylate functionality.

Curatives of the present invention can be photocatalysts or thermal curing agents.

Catalysts of the present invention (also known as "initiators," the terms being used interchangeably in the present invention) preferably can be activated by photochemical techniques. Known photocatalysts are of two general types: onium salts and cationic organometallic salts, and both are useful in the invention. Such catalysts are disclosed in U.S. Pat. No. 5,709,948, which is incorporated herein by reference for this disclosure.

Photoinitiators useful in the invention can be present in an amount in the range of 0.01 to 10 weight percent, preferably 0.01 to 5 weight percent, most preferably 0.1 to 2 weight percent based on total resin composition.

Certain thermally-activated curing agents for epoxy resins (e.g., compounds that effect curing and crosslinking of the epoxide by entering into a chemical reaction therewith) are useful in the present invention. Preferably, such curing agents are thermally stable at temperatures at which mixing of the components takes place. Such thermally-activated curing agents are disclosed in U.S. Pat. No. 5,709,948, which is incorporated herein by reference for this disclosure.

Thermal curative can be present in an amount such that the ratio of epoxy equivalents to thermal curative equivalents is in the range of 9:1 to 2:1.

Homopolymeric polyolefins useful in the invention include polyethylene, polypropylene, poly-1-butene, poly-1-pentene, poly-1-hexene, poly-1-octene and related poly-olefins. Preferred homopolymeric polyolefins include polyethylene (e.g., FINA 3868, Total Petrochemicals, Houston, Tex. and Dow HDPE 25455, available from Dow Chemical Co., Midland, Mich.) and polypropylene (e.g., Dow DS5D45, Dow Chemical Co., Midland Mich., or Exxon ESCORENE 3445 and 3505G, available Exxon Chemicals, Houston, Tex.). Also useful are copolymers of these alpha-olefins such as MOPLEN EP60, BIANCO and PROFAX 7823, both from Basell USA, Inc. Elkton, Md., including propylene-co-1-butene, as well as rubber-modified polypropylene, e.g., SRD7-462, SRD7-463, and DS7C50, each of which is available from Dow Chemical Co., Midland Mich.), and SRD6-328, also available from Dow Chemical Co., Midland Mich.), and related copolymers. Diene rubbers, e.g., NORDEL series, Dow Chemical Co., Midland Mich. are useful. Preferred copolymers are poly(ethylene-co-propylene). Also useful is the VESTOPLAST series of polyolefins available from Degussa Corp., Parsippany, N.J.

The IPNs of the invention also comprise functionalized polyolefins, i.e., polyolefins that have additional chemical functionality, obtained through either copolymerization of olefin monomer with a functional monomer or graft copolymerization subsequent to olefin polymerization. Typically, such functionalized groups include O, N, S, P, or halogen heteroatoms. Such reactive functionalized groups include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the ELVAX series, commercially available from Du Pont Chemicals, Wilmington, Del., the ELVAMID series of ethylene-polyamide copolymers also available from Du Pont, and ABCITE 1060WH, a polyethylene-based copolymer comprising approximately 10% by weight of carboxylic acid functional groups, commercially available from Dow Chemical Co., Inc., Midland, Mich. Examples of graft-copolymerized functionalized polyolefins include maleic anhydride-grafted polypropylene, such as the EPOLENE series of waxes commercially available from Eastman Chemical Co., Kingsport, Tenn.

Various adjuvants, including insulating or reinforcing materials, can also be added to the compositions of the invention to alter the physical characteristics of the cured IPN. Included among useful adjuvants are thixotropic agents such as fumed silica; pigments to enhance color tones such as ferric oxide, carbon black and titanium dioxide; fillers including silicates such as mica, silica, acicular wollastonite, and feldspar; calcium carbonate, magnesium sulfate and calcium sulfate; clays such as bentonite; glass beads and bubbles; thermally expandable beads and microbeads; reinforcing materials such as unidirectional woven and nonwoven webs, e.g., nets and cloths, and staple fibers of organic and inorganic fibers such as polyester, polyimide, glass fibers, polyamides such as poly(p-phenylene terephthalamide), carbon fibers, and ceramic fibers, plastic or steel mesh, and rods; and stabilizers and flow agents. Amounts up to about 200 parts of adjuvant per 100 parts of IPN composition can be used.

Single, multilayer or multicomponent compositions, where at least one of the layers is an interpenetrating network, can be delivered in the form of pellets, powder, fibers, films, non wovens, textiles, rods, profile shaped articles, tubes, shrinkable sleeves, and coated surfaces, pressure sensitive adhesive (psa) coated constructions, and the like. The layers can be independently applied to the substrate to be protected or they can be coextruded. Shrinkable sleeves find particular utility as pipe joint coatings.

Insulative materials, such as glass bubbles, fibers, and cloth can be incorporated in the compositions of the invention when they are used, for example, in chemically and thermally harsh environments. Glass bubbles, for example, can provide desirable insulation to the coated articles of the invention.

IPNs of the invention may be prepared by batch or continuous processing.

Batch processing can be accomplished by adding solid polyolefin, typically in pellet form, to a preheated mixer, such as a Brabender mixer (C. W. Brabender Instruments, Inc., South Hackensack, N.J.) equipped with, e.g., cam or sigma blades, at a temperature that is less than the thermal activation temperature of the curative. After stirring for about 5 minutes, the fully pre-polymerized polyolefin is melted and a mixture of liquid epoxy resin and optionally a curative for the epoxy resin, and when used, is added with continued stirring. Typically, an immediate reduction in torque and melt temperature is noticed as the polyolefins and epoxy are blended. The resultant mixture is stirred to ensure complete mixing and is removed from the mixer while still molten. The mixture can then be molded, formed, shaped, extruded, or pressed into a desired final configuration and irradiated and/or heated to cure and crosslink the epoxy resin component. In particular, when a thin sheet or film is desired, the molten mass can be pressed in a heated flat-plate press, such as a Carver laboratory press (Carver, Inc., Wabash, Ind.).

Continuous processing can be accomplished using an extruder e.g., a twin-screw extruder, equipped with a downstream port, a static mixer and an appropriate output orifice (fib die, sheet die, fiber die, profile die, etc.) and a take-up roll and one or more wind-up rolls, as appropriate. Solid polyolefin is added to the input end of the extruder and processed using a temperature profile that is appropriate for the polyolefin and that is less than the thermal activation temperature of the epoxy curing agent. Take-up line speed is adjusted as appropriate for the output (sheet, fiber, etc.), typically from about 0.5 meters per minute to about 200 meters per minute.

Preferably, crosslinking of the polyolefin is affected by one or both of radiation, preferably e-beam radiation, and thermal energy. More preferably the polyolefin is polypropylene or polyethylene. Polyolefins that provide a double bond, e.g., end of chain backbone unsaturation or functionality, can be polymerized by one or more of free radicals, by radiation (including electron beam), and by thermal energy (including a combination of peroxide/heat).

In cases where thermal curing of the epoxy is desirable immediately after extrusion, i.e., before the polyolefin cools and crystallizes, further heating of the extrudate can take place directly at the die orifice or at a casting wheel. When it is desired that epoxy cure take place after the polyolefin cools and crystallizes, the heat source(s) can be located just prior to the take-up roll. Finally, it may be desirable that no epoxy curing take place after extrusion, in which case the heating source(s) may be absent.

In the case where photocuring of the epoxy is desirable immediately after extrusion i.e., before the polyolefin cools and crystallizes, ultraviolet (UV) irradiation of the heated extrudate can take place directly at the die orifice. Irradiation can be accomplished by using any of commercially-available UV sources, such as one or more Fusion Systems D or H bulbs (available from Fusion W Curing Systems, Gaithersberg, Md.) or Sylvania BL 350 bulbs. When it is desired that epoxy cure take place after the polyolefin cools and crystallizes, the light source(s) can be located just prior to the take-up roll. Finally, it may be desirable that no immediate epoxy curing take place after extrusion, in which case the irradiation devices may be absent.

It is within the scope of the invention that a polyolefin-epoxy IPN, obtained from a sheet die, may be drawn either uniaxially or biaxially as it emerges from the die. Cure, as above, may take place either before or after such drawing is complete.

Compositions of the present invention can be useful in a number of applications that take advantage of the unique properties that result from preparation of IPNs. The unique combination of high adhesiveness imparted by epoxy resins and high chemical inertness of polyolefins leads to materials that have utility as coatings for pipes and other metallic surfaces subject to harsh, aggressive chemical environments. Thus, coatings prepared from compositions of the invention may be used on the exteriors of steel pipes and on iron or steel rods used in reinforcing concrete, commonly known as "rebar". Such coatings may also be applied to the interior of pipes to protect them from corrosive chemicals.

IPN films of the invention may be applied as protective coatings, using any coating method known in the art, preferably by spraying as a powder or by wrapping as a flat sheet or extrudate, to a wide variety of substrates, including metal substrates such as steel, aluminum and copper. Metal pipes that can be spirally wrapped can vary in length and width depending on use, but generally are in the range of 1 to 20 meters, preferably 5 to 20 meters in length and in the range of 1 to 50 cm, preferably 2 to 50 cm in diameter. When applied to metal substrates or FBE's, films of the invention are advantageously applied in the molten state or at an elevated temperature such as 175 to 250° C. such that the substrate is thoroughly wetted prior to the epoxy curing step in order to maximize adhesion to the substrate.

In some embodiments, the IPN films of the invention may be applied to metal substrates, such as steel, aluminum, and copper, which have welds, such as girth welds, seams, seals, or patches. In some embodiments, at least a portion of a previously-applied protective coating may be removed from the substrate by peeling, scraping, sandblasting, and the like, to expose an area to be welded, sealed, or patched, and the IPN films of the invention may be applied directly over the weld, seam, seal, or patch. In some embodiments, the IPN films of the invention adhere to the previously-applied protective coating without the need for an intermediate layer, such as an adhesive layer, although such a layer may be used if desired. Alternatively, the IPN films of the invention may be applied over a liquid or powder epoxy that has been applied to the weld, seam, seal, or patch and that has been at least partially cured. The welded, sealed, or patched metal substrate may be cleaned, roughened, or otherwise prepared prior to application of the IPN film.

The fusion-bonded epoxy layer is prepared from, for example, commercially available powdered SCOTCHCAST Electrical Resin 226N (3M Company, St. Paul, Minn.) according to the directions provided by the manufacturer. Thickness of such layers can be in the range of 0.05 mm to 1.0 mm.

It is also within the scope of the present invention to provide a joint overlap patch and repair composition and method.

An IPN film patch having a size in the range of less than one square millimeter to tens or hundreds of square meters, and thickness in the range of 0.025 mm to 25 mm, can be extruded and coated onto an IPN- or other polymer-coated pipe or other metal article mentioned above. Other polymeric coatings can comprise, for example a thermoplastic (e.g., polyolefin) or thermoset (e.g., epoxy) resin coating. Alternatively, the patch can be applied by using an IPN adhesive stick or by heating finely powdered IPN to form a patch of suitable dimensions. The pipe area needing patching preferably is cleaned, such as by grit blasting, scouring with a pad such as SCOTCH-BRITE scour pad (3M Company, St. Paul, Minn.), sandpaper, or with a router or any other rotating device that cuts or abrades or roughens a surface. Depending on the composition of the IPN, preferably the surface is heated to a temperature in the range of 80 to about 230° C., more preferably about 200° C. The IPN or other polymer coated pipe can comprise intermediate epoxy and/or tie layers that also may have sustained damage and can be patched in the same procedure. The IPN patch also preferably is heated when applied using heat sources such as a hot plate, heat gun, hot air welding device, and the like, with the aid of, for example, a roller, press, or finger pressure, to ensure smoothness of the patch. Using this procedure excellent adhesion has been observed. However, if desired, a liquid or powdered primer coating such as fusion bonded or liquid epoxy (such as SK 327 two-part liquid epoxy from 3M Company, St. Paul, Minn.) can be utilized in conjunction with the IPN patch. Girth welds, joints, or protuberances in the steel can also be patched relatively seamlessly with an IPN coating using this method.

Finely powdered IPN can be made from IPN pellets that are milled or ground, if necessary, while cooling during the process using liquid nitrogen to avoid overheating or to generate a finer powder. Several applications of liquid nitrogen may be necessary to keep the pellets from heating in the mill. The powder can then be separated using a mesh sieve. The pipe or other metal object needing repair can be heated to a temperature in the range of 80 to 230° C. so that powdered IPN added to the damaged area and overfilling it can be fused to the previous IPN or other polymeric coating as well as to any exposed intermediate layers and exposed pipe when present. The powder can be sprinkled, deposited or sprayed to cover the damaged area (cleaned, as noted above) containing one or more discontinuities. The IPN patch preferably is sized to cover the damaged area as well as an additional area on all sides of the damage to insure good bonding to the original IPN or other polymeric surface. The bonded IPN coating fuses securely to the repaired surface and becomes virtually indistinguishable therefrom when the repaired surface is an IPN. Alternatively, the IPN patching powder can be electrostatically sprayed, applied using a fluidized bed or by any other method known to those skilled in the art. Complex parts, valves, girth welds, and joints exhibiting problems due to discontinuities or protuberances in an IPN or other polymeric coated metal can also be treated using IPN powder or IPN powder in combination with fillers, pigments, and other adjuvants known to those skilled in the art.

An IPN repair stick or welding rod (similar to a glue stick) can be made in a mold using heated and compressed pellets. The surface of a damaged steel pipe or other object can be heated to a temperature in the range of 80 to 230° C. as described above. The repair stick can be placed on the damaged surface, held in place for a time sufficient to allow IPN material to flow and fill the discontinuity. In the alternative, a torch or flame can be used in combination with pressure, such as a roller, if necessary. A hot air welder can be used to speed up this process. The IPN material from the stick fuses to the original IPN coating or other polymeric coating (e.g., thermoplastic or thermoset) on the metal, such as steel, and becomes firmly bonded thereto and contiguous therewith when the damaged coating is an epoxy/olefin IPN. If desired, a liquid or powder primer coating such as fusion bonded, liquid, or repair stick epoxy, e.g., SCOTCHKOTE 226P, available from 3M Company, St. Paul, Minn., can be utilized in combination with the IPN repair stick.

Girth welds of two sections of IPN or other polymer coated pipe can be achieved using any of the procedures described above. The sections of pipe to be bonded are placed in the desired position and IPN is used to fill and enclose the joint and produce a secure seam.

Free-standing films prepared from the IPN can be useful to wrap a metal pipe, preferably a steel pipe with an intermediate layer of fusion bonded or liquid epoxy. Free-standing films prepared from the IPN also find utility in patches and girth weld coatings.

IPN films of the invention may be applied to repair a crack, hole, scrape, or other damage in a previously-applied polymeric or IPN coating. It is useful to be able to repair damage to substrates or to the protective coatings. It is particularly useful to be able to make such repairs in the field, i.e., to substrates that are in or at the place where they will be or are being used. For example, pipes can suffer cracks or other damage. The damage may be to either or both the pipe or any of the coatings thereon.

Kits comprising the IPNs of the invention, as well as one or both of heat sources and pressing means, can be of particular use in the field. The IPN can be provided as powder, liquid, pellets, sheets, sticks, and rods and the like. Useful heating sources include heat guns, hot air welders, ultrasonic welders, torches, induction heaters, microwave heaters, infrared heaters, and the like. Useful pressing means include rollers, plates, belts, and the like. An adhesive or primer can be used, although it generally is not necessary.

The IPN layer can comprise polyolefin and epoxy resins, catalysts, and adjuvants such as fillers, pigments, stabilizers, and flow agents.

The coated articles of the invention are useful to provide corrosion protection or insulation for metal surfaces, for example, pipes, vessels, conduits, rods, profile shaped articles, or tubes that transport or are exposed on any surface to fluids at varying temperatures and having various chemical compositions, including those of a corrosive nature.

The present invention provides IPN patches, welds, and joint repairs for a coated pipe, vessel, conduit, rod, profile shaped article, or tube. A pipe, for example, can have many welded joints along its length. The coating composition adheres, fuses, or welds strongly to all areas of the pipe or to an intervening layer, such as a fusion-bonded epoxy (FBE) layer, that can be coated on the pipe. The present invention provides excellent adhesion to a pipe or an intervening layer. If a layer of FBE is coated directly on the pipe, a curative for the epoxy in the IPN can be omitted.

Objects and advantages of this invention are further illustrated by the following examples, but the particular materials and amounts thereof recited in these examples, as well as other conditions and details, should not be construed to unduly limit this invention.

EXAMPLES

All weight percents of materials are based on the weight of the total composition.

As used herein:

"CD" refers to cathodic disbandment;

"FBE" refers to fusion bonded epoxy;

"G3003" refers to EPOLENE G-3003, a maleated polyolefin available from Eastman Chemical Co., Kingsport, Tenn.;

"MOPLEN" refers to MOPLEN COAT EP/60 BIANCO, a polyolefin available from Basell North America, Inc., Elkton, Md.;

"EPON 828" refers to EPON 828, an epoxy resin obtained from Resolution Performance Products, Houston, Tex.

Examples 1-4

Cathodic Disbondment of IPN Compositions Applied to FBE

A composition of 95 weight percent of a mixture of 95 parts by weight of MOPLEN and 5 parts by weight G3003, and 5 weight percent EPON 828, all based on the weight of the total resin composition, was compounded using a Haake 18 millimeter twin screw extruder at 200 rpm. The temperature profile in the extruder ranged from approximately 200° C. to approximately 220° C. The rolls in the casting station were set to 20° C. The thickness of the extruded film was 0.635 millimeters (0.025 inches). The film composition was applied to each of four 4 inch by 4 inch by 0.25 inch steel panels that were first cleaned by sandblasting/tumbling with G40 grit particles and were then coated with a 0.152 mm (0.006 inch) thick layer of Scotchkote 226N11G fusion bonded epoxy (available from 3M Company, St. Paul, Minn.) that was applied according to the directions provided by the manufacturer. That is, the extruded film was applied to the surface of the FBE coating on each panel. Each panel was heated for five minutes on a hot plate to a temperature of 200° C. and then the film was applied to the panel (onto the surface of the FBE coating) with a silicone roller. The laminated article was allowed to remain on the hot plate for an additional ten minutes, after which time it was removed from the hot plate and was allowed to cool to room temperature. Each sample was evaluated for cathodic disbandment according to the Canadian Standards Association test CSAZ245.20 for 28 days in 3 weight percent aqueous NaCl solution at a voltage of −1.5V and at a temperature as indicated with the data in Table 1. These examples show that coatings of IPN on FBE on steel met the standards of the test and showed good cathodic disbondment performance.

TABLE 1

CD of Examples 1-4

| Example | Temperature | CD Radius (mm) |
|---|---|---|
| 1 | 100° C. | 9.2 |
| 2 | 75° C. | 5.8 |
| 3 | 50° C. | 6.6 |
| 4 | 25° C. | 6.6 |

Examples 5-7

Low Temperature Bend Tests of IPN-Coated Steel Pipe

A laboratory pipe coater was used to wrap 3-inch diameter steel pipes, previously cleaned by sandblasting, with IPN compositions. The pipes were first coated with a 0.152 mm (0.006 inch) layer Scotchkote 226N 11G fusion bonded epoxy (available from 3M Company, St. Paul, Minn., and applied according to the directions provided by the manufacturer) and then with the same polymer composition used in Examples 1-4. The polymer compositions were extruded at a temperature of approximately 195° C. and were applied to the pipes, which had been heated to 204° C. and 232° C. Sections of each of the five coated pipes were cut into sections having dimensions of 25.4 mm by 177.8 mm (1 inch by 7 inches). These sections of pipe were tested at a temperature of −30° C. according to Canadian Standard CSAZ245.20, except that the angle of bending was 7.25°. The thickness of each pipe coating is given in Table 2. No cracks or other marks were observed in any of the samples of coated pipe sections. These examples show that a IPN coated on a FBE resisted cracking when the coated substrate is bent.

TABLE 2

Pipe Coatings of Examples 5-7

| Example | FBE Thickness (mm) | Polymer Thickness (mm) |
|---|---|---|
| 5 | 0.152 | 0.51 |
| 6 | 0.152 | 0.965 |
| 7 | 0.152 | 1.47 |

Example 8

Repair of a Damaged Protective Coating

An IPN composition of 85 weight percent of a mixture of 89 parts by weight MOPLEN, 5 parts by weight G3003, 5 parts by weight EPON 828 and 1 part by weight black pigment polypropylene master batch (obtained from Penn Color Inc., Doylestown, Pa.) was combined with 15 weight percent wollastonite (R.T. Vanderbilt Co., Inc., Norwalk, Conn.), all based on the weight of the total resin composition, and was extruded as a 0.61 mm (0.024 in) thick film onto a 102 mm by 102 mm by 6.35 mm (4 inch by 4 inch by 0.25 inch) steel coupon that had been cleaned by grit blasting as described in Examples 1-4. The coated coupon was then damaged using a 9.53 mm (0.375 inch) diameter drill bit. Separately, a sample of the IPN composition was extruded, and a 25.4 mm by 25.4 mm (1 inch by 1 inch) sample of the extruded sheet was then used as a patch to repair the damaged coated coupon. The coated coupon was heated on a hot plate. The surface of the hot plate was determined to be approximately 230° C. The surface of the coated steel coupon was determined to be approximately 200° C. The coated coupon was heated for 5 minutes before the patch was applied to the surface. A heat gun was then used, over about one minute, to heat the patch until it conformed to the damaged surface. The plate was heated for an additional 9 minutes on the hot place while a roller was occasionally used to smooth out the surface. The patch fused to the material that was already coated on the steel and bonded to the exposed steel surface. After the repair was complete, the sample was allowed to cool to room temperature and then the patched coating was cut with a utility knife in an "X" pattern. The patched coating could not be separated from the steel coupon where the coating was cut. This example shows that a damaged IPN coating on steel was repaired with a film of IPN composition.

Example 9

Repair of a Damaged Protective Coating with Powdered IPN

An IPN powder was made from the material prepared as described in the Example 8. Pellets of the IPN were cooled using liquid nitrogen as they were ground into a fine powder with a Scienceware Micro-Mill (obtained from Bel-Art Products, Inc., Pequannock, N.J.). The powder was then separated using a 35-mesh screen. A steel coupon was coated and damaged as described in Example 8 and the damage was repaired using the IPN powder as a patch. The coated coupon was heated on a hot plate. The surface of the hot plate was determined to be approximately 230° C. The surface of the coated steel coupon was determined to be approximately 200° C. The coated coupon needing the repair was heated for five minutes before the IPN powder was applied to the surface. Enough IPN powder was used to overfill the hole. It was allowed to heat for approximately 1 minute, and then a roller was used to smooth the surface. Additional material was added and then a roller was used to smooth the surface. The total time that the sample was on the hot plate was approximately 15 minutes. The patch fused to the material that was already coated on the steel and bonded to the exposed steel surface. After the repair was complete, the sample was allowed to cool to room temperature and then the patched coating was cut with a utility knife in an "X" pattern. The patched coating could not be separated from the steel coupon where the coating was cut. This example shows that a damaged IPN coating on steel was repaired using a powdered IPN composition.

Example 10

Repair of a Damaged Protective Coating with a IPN Stick

An IPN stick was made from the material prepared as described in the Example 8. The stick was made in a mold that was fed continuously by a Micro 15 Twin Screw Compounder (DSM Research Netherlands). In the compounder, the material was heated briefly to 200° C., and was then extruded into a mold, assisted by a 14.9 mm (0.588 inch) diameter plunger. The plunger was used to collect the material, which was then compressed in the mold. A steel coupon was coated and damaged as described in Example 8, and the damage was repaired using the IPN stick to make a patch. The coated coupon was heated on a hot plate. The surface of the hot plate was determined to be approximately 230° C. The surface of the coated steel coupon was determined to be approximately 200° C. The coated steel coupon was heated for approximately five minutes before the IPN stick was applied to the surface, first in the center of the damaged area. The stick was placed on the surface of the exposed steel for approximately 1 to 2 minutes. The IPN composition flowed into and onto the damaged area. The stick was slowly removed in order to prevent any loss of material from the surface. A roller was used to make the patch flush with the surface. The total time on the hot plate was 15 minutes. The patch fused to the material that was already coated on the steel and bonded to the exposed steel surface. After the repair was complete, the sample was allowed to cool to room temperature and then the patched coating was cut with a utility knife in an "X" pattern. The patched coating could not be separated from the steel coupon where the coating was cut. This example shows that a damaged IPN coating on steel was repaired using an IPN stick composition.

Also, one can use the procedures of Examples 8-10 to repair conventional pipes, coated with e.g., thermosets and/or thermoplastics, to repair damage in accordance with the above examples using IPN coatings.

Example 11

Full-IPN Coating on a Metal Pipe

Steel pipes (7.6 cm in diameter and 6.3 mm in thickness) were coated using a mixture of crosslinkable thermoplastic and thermoset materials (described below). The materials were mixed and palletized using a Berstorff ZE25 Ultraglide co-rotating screw extruder (Berstorff GmbH, Hanover, Germany) at 150 rpm, having a cooling water trough and a rotating knife pelletizer. The temperature profile in the extruder was 175-205-205-205-205-205-220-220-220 degrees C. Average pressure was 3.1 Mpa. The pellets were utilized by the single screw extruder of a pipe wrapping station and delivered to a rotating pipe as a 0.5 mm thick film. The final thickness of the wrapped film coating was 1.5 mm. Prior to wrapping the pipe was grit blasted and cleaned with methyl ethyl ketone solvent. The pipe was preheated to 215° C. before being placed on the rotating mandrel of the extruder.

The composition of the resin mixture was as follows: resins comprised 85 percent by weight (based on the weight of the total mixture) and included 60% by weight of propylene/ethylene copolymers (PROFAX 7823, Basell USA Inc., Elkton, Md.), 30% by weight of a diene/propylene/ethylene terpolymer (NORDEL 34820, Dupont-Dow Elastomers, Wilmington, Del.), and 5 percent by weight of a maleic anhydride functionalized polypropylene and an aromatic epoxy monomer (EPOLENE G3003, Eastman Chemical Co., Kingsport, Tenn.). A filler mixture (15 weight percent of the total composition) comprised 90 weight percent wollastonite, 5 weight percent $TiO_2$, and 5 weight percent adjuvants. The adjuvants included 2 weight percent dicumyl peroxide (TRIGONOX 145-45B, Akzo Nobel, Chicago, Ill.), 1.5 weight percent phenolic antioxidant (IRGONOX, Ciba Specialty Chemicals, Tarrytown, N.Y.), and 1.5 weight percent UV blocker (TINUVIN 791, Ciba Specialty Chemicals, Tarrytown, N.Y.). A cathodic disbondment test was performed for fusion-bonded epoxy in accordance with the Canadian Standards Association (CSA Z245.21-98). The test conditions were: 28 days, 1.5 weight percent NaCl solution, at 65° C. and 80° C. The disbondment radius reported was 5.3 mm for 65° C. and 6.5 mm for 80° C. Additionally, a similar steel pipe precoated with fusion bonded epoxy was heated to 380° C. and wrapped in the same manner to obtain a total thickness of 47 mils (1.2 mm) with 6-7 mils (0.5 mm) of fusion-bonded epoxy. The cathodic disbondment radii were 2.7 mm at 65° C. and 4.0 mm at 80° C.

The above data show good cathodic disbondment results for a full-epoxy/olefin IPN wrapped pipe. Cathodic disbandment results can also be improved when an intermediate fusion bonded epoxy layer was present.

Various modifications and alterations of this invention will become apparent to those skilled in the art without departing from the scope and intent of this invention, and it should be understood that this invention is not to be unduly limited to the illustrative embodiments set forth herein.

It is claimed:

1. A coated article comprising a metal substrate including a multi-layered coating on at least one surface thereof, said multi-layered coating comprising:
    a partially-cured or fully-cured layer of at least one of an epoxy resin and a fusion bonded epoxy, said partially-cured or fully-cured layer provided on at least one surface of said metal substrate, and
    an overcoat layer of a semi-interpenetrating polymer network (IPN) or full-interpenetrating polymer network (IPN), said overcoat layer provided on said partially-cured or fully-cured layer;
    wherein the semi-IPN comprises a cured epoxy resin and a polyolefin component that is linear and not crosslinked;
    wherein the full-IPN comprises a cured epoxy resin and a polyolefin component that is crosslinked; and
    wherein said metal substrate is selected from the group consisting of a pipe, a vessel, a conduit, a rod, a profile shaped article, and a tube.

2. The coated article according to claim 1, wherein said semi-IPN or full-IPN is formed from a formulation comprising:
    a) 0.1 to 50 weight percent, based on the total formulation, of a curable epoxy resin,
    b) an effective amount of a photocatalyst or a thermal curing agent for curing the curable epoxy resin, and
    c) 1 to 99.9 weight percent, based on the total formulation, of at least one fully pre-polymerized hydrocarbon polyolefin resin and 0 to 98.9 weight percent, based on the total formulation, of a fully pre-polymerized functionalized polyolefin resin, wherein the total of said at least one fully pre-polymerized hydrocarbon polyolefin resin and said optional fully pre-polymerized functionalized polyolefin resin account for 50 to 99.9 weight percent of the total formulation; and
    wherein the formulation for forming the full-IPN further comprises a crosslinking agent for crosslinking component c).

3. The coated article according to claim 2 wherein said formulation further comprises an adjuvant selected from the group consisting of insulation materials, reinforcing materials, and fillers.

4. The coated article according to claim 3, wherein said adjuvant is selected from the group consisting of feldspar, wollastonite, bentonite, titanium dioxide, bubbles, beads, fibers, and cloths.

5. The coated article according to claim 3 wherein said reinforcing materials are selected from the groups consisting of nets, cloths, fibers of organic or inorganic materials, plastic or steel mesh, and rods.

6. The coated article according to claim 2, wherein said semi-IPN or full-IPN is formed from a formulation comprising:
    a) 1 to 10 weight percent, based on the total formulation, of a curable epoxy resin, b) an effective amount of a photocatalyst or a thermal curing agent for curing the curable epoxy resin, and c) 80-98 weight percent, based on the total formulation, of rubber modified polypropylene and 1 to 10 weight percent, based on the total formulation, of functionalized polypropylene; and wherein the formulation for forming the full-IPN further comprises a crosslinking agent for crosslinking component c).

7. The coated article according to claim 6, wherein said multi-layered coating further comprises a topcoat layer comprising at least one hydrocarbon polyolefin, said topcoat layer provided on said overcoat layer.

8. The coated article according to claim 6, wherein said metal substrate is a steel pipe.

9. The coated article according to claim 6, wherein said formulation further comprises an adjuvant selected from the group consisting of insulation materials, reinforcing materials, and fillers.

10. The coated article according to claim 9, wherein said adjuvant is selected from the group consisting of feldspar, wollastonite, bentonite, titanium dioxide, bubbles, beads, fibers, and cloths.

11. The coated article according to claim 9, wherein said reinforcing materials are selected from the groups consisting of nets, cloths, fibers of organic or inorganic materials, plastic or steel mesh, and rods.

12. The coated article according to claim 1 wherein said polyolefin component of the semi-IPN or full-IPN comprises one or both of polypropylene and polyethylene.

13. The coated article according to claim 1 wherein said polyolefin component of the semi-IPN or full-IPN is selected from the group consisting of high density polyethylene, ultra-high molecular weight polyethylene, linear low density polyethylene, low density polyethylene, metallocene polyolefin, unsaturated polyolefin rubber, saturated polyolefin rubber, isotactic polypropylene, polymethylpentene, cyclic olefin, polybutylene, and combinations, blends, and mixtures thereof 14. The coated article according to claim 1 wherein said cured epoxy resin of the semi-IPN or full-IPN is a cured product of an epoxy resin selected from the group consisting of aromatic epoxy resins, cycloaliphatic epoxy resins, and heterocyclic epoxy resins.

15. The coated article according to claim 1 wherein said polyolefin component of the full-IPN is crosslinked by one or more of free radical generators, end of chain backbone unsaturation or functionality, radiation, and thermal energy.

16. The coated article according to claim 15 wherein said radiation comprises electron beam radiation.

17. The coated article according to claim 1 wherein said metal substrate is a steel pipe.

18. The coated article according to claim 1, wherein said multi-layered coating further comprises a topcoat layer comprising at least one hydrocarbon polyolefin, said topcoat layer provided on said overcoat layer.

* * * * *

UNITED STATES PATENT AND TRADEMARK OFFICE
CERTIFICATE OF CORRECTION

PATENT NO. : 7,790,288 B2
APPLICATION NO. : 11/463989
DATED : September 7, 2010
INVENTOR(S) : Perez et al.

It is certified that error appears in the above-identified patent and that said Letters Patent is hereby corrected as shown below:

Column 3,
Lines 64 and 66, delete each occurrence of "cathodic disbandment" and insert
-- cathodic disbondment -- therefor.

Column 5,
Line 16, delete "cathodic disbandment" and insert -- cathodic disbondment -- therefor.

Column 10,
Line 54, after "extruder" insert -- . --.

Column 14,
Lines 18 and 61, delete each occurrence of "cathodic disbandment" and insert
-- cathodic disbondment -- therefor.

Column 18,
Lines 4-6, delete each occurrence of "cathodic disbandment" and insert
-- cathodic disbondment -- therefor.

Column 20,
Line 9, after "thereof" insert -- . --.

Signed and Sealed this
Eighteenth Day of January, 2011

David J. Kappos
*Director of the United States Patent and Trademark Office*